Patented Jan. 17, 1928.

1,656,572

UNITED STATES PATENT OFFICE.

HERMANN SIGISMUND SCHULTZE, OF GRIESHEIM-ON-THE-MAIN, GERMANY, ASSIGNOR TO THE FIRM I. G. FARBENINDUSTRIE AKTIENGESELLSCHAFT, OF FRANKFORT-ON-THE-MAIN, GERMANY.

METHOD OF AGGLOMERATING PULVERULENT MATERIALS.

No Drawing. Application filed May 5, 1927, Serial No. 189,165, and in Germany April 10, 1926.

This invention relates to a method of transforming pulverulent materials into small pieces adapted for use in gas reactions.

When material present in the form of powder, is to react in great quantities, simultaneously and uniformly with gases, a difficulty arises due to the fact, that the gases, when passed through the powder, meet with an excessive resistance. Various methods have been proposed to overcome this difficulty, but all of them are subject to peculiar drawbacks. When operating on a large scale, recourse has been taken to briquetting and agglomeration. With the latter method, however, the resulting agglomerates, for instance balls, are of so different a size that different lengths of time are required for completing the reaction in the interior of the agglomerates whereby the whole duration of the reaction is undersirably prolonged.

According to the method forming the object of the present invention, the material under treatment is obtained, independently of its nature, in the form of highly porous, small pieces having a surprisingly uniform size, viz, in the form of small balls, of approximately the size of peas.

For carrying out my invention, the finely powdered material to be transformed to "peas" is spread in a uniform layer of about one half to one inch, preferably upon a conveyer belt, whereupon the latter is passed beneath a series of dropping pipes from which drops of a suitable liquid, for instance, water, or a salt solution, are made to drop.

The distance between the adjacent drops is calculated so as to prevent the uniting of the drops. By absorbing the liquid the powder is formed to ball-like, moist bodies or "peas" of a loosely coherent mass, which bodies may be easily separated from the excess of powder by careful sifting-off. The sifted, still moist "peas" are preferably left upon the sieve and dried in any suitable manner, for instance, by passing the sieve, forming a conveyer belt, through a drying-kiln. The moisture of the "peas" amounts to about 10 to 15%; the amount depending upon the nature and the fineness of the powdered material. A preliminary condition for the formation of the "peas" is that the material under treatment be capable of being wetted.

The mechanic stability of the dried "peas" entirely depends upon the nature of the powder employed and the additions made to the liquid, which additions must be ascertained from case to case by experiment. Salts or mixtures of insoluble substances with a salt, require, as a rule, only a treatment with pure water. As the size of drops may be varied in rather wide limits by varying the form of the dropping-surfaces, I am able to produce "peas" of greater or smaller diameter, as desired.

The charge of a reaction chamber filled with dried "peas" opposes only a small resistance to the passage of gases, although the reactive surface is a considerable one. Owing to the small diameter of the single "peas" and the great porosity of the material, the reaction penetrates rapidly and uniformly to the interior of the "peas". The hardness of the dried "peas" generally suffices for allowing of piling up the mass to a height of several meters.

Owing to its simplicity the method according to my present invention is adapted to be advantageously substituted in many cases for the hitherto prevailing troublesome method of pressing pills, or, generally speaking, to enable reactions between gases and pulverulent materials on a factorial scale.

I claim:—

1. The method of transforming pulverulent material into small pieces of uniform size adapted for use in gas reactions which consists in spreading the material in the form of a layer, making drops of a liquid fall separately upon the said layer, separating the resulting ball-like bodies from the excess of powder, and drying the said bodies.

2. Method in accordance with claim 1, comprising sifting off the resulting ball-like bodies and conveying the sieve with the ball-like bodies thereon through a drying-kiln.

In testimony whereof I affix my signature.

HERMANN S. SCHULTZE.